(12) United States Patent
Brewington et al.

(10) Patent No.: US 11,232,149 B2
(45) Date of Patent: *Jan. 25, 2022

(54) ESTABLISHMENT ANCHORING WITH GEOLOCATED IMAGERY

(71) Applicant: Google LLC, Mountain View, CA (US)

(72) Inventors: Brian Edmond Brewington, Superior, CO (US); Kirk Johnson, Boulder, CO (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,998

(22) Filed: Jul. 24, 2019

(65) Prior Publication Data

US 2019/0347289 A1 Nov. 14, 2019

Related U.S. Application Data

(63) Continuation of application No. 14/816,574, filed on Aug. 3, 2015, now Pat. No. 10,467,284.

(51) Int. Cl.
*G06F 7/00* (2006.01)
*G06F 16/58* (2019.01)
(Continued)

(52) U.S. Cl.
CPC .......... *G06F 16/5866* (2019.01); *G06F 16/29* (2019.01); *G06F 16/51* (2019.01);
(Continued)

(58) Field of Classification Search
CPC ............. G06F 16/9537; G06F 16/5866; G06F 16/24578; G06F 16/583; G06F 16/51;
(Continued)

(56) References Cited

U.S. PATENT DOCUMENTS 7,065,705 B1 6/2006 Wang et al.
7,917,286 B2 3/2011 Taylor et al.
(Continued)

FOREIGN PATENT DOCUMENTS

CN 103930901 A 7/2014
EP 2541487 A1 1/2013
(Continued)

OTHER PUBLICATIONS

Notification of the First Office Action for Chinese Patent Application No. 201680026472.1 dated Sep. 3, 2020. 11 pages.
(Continued)

*Primary Examiner* — Md I Uddin
(74) *Attorney, Agent, or Firm* — Lerner, David, Littenberg, Krumholz & Mentlik, LLP

(57) ABSTRACT

The technology relates to determining an establishment's presence at a geolocation. A computing device may receive a first image including location data associated with the first image's capture. A set of images, which include location information and one or more identification marks associated with one or more establishments may also be received. The computing device may compare the first image to the set of images to determine whether the first image contains one of the one or more identification marks, and determine that one of the one or more establishments, associated with the one of the one or more identification marks contained in the first image, is currently located within a set proximity of the first image location. The computing device may also update a location database by associating the one of the one or more establishments with a location within a set proximity of the first image location.

14 Claims, 8 Drawing Sheets

(51) Int. Cl.
  *G06F 16/29*   (2019.01)
  *G06F 16/51*   (2019.01)
  *G06F 16/9537* (2019.01)
  *G06K 9/00*    (2006.01)
  *G06F 16/951*  (2019.01)

(52) U.S. Cl.
  CPC ........ *G06F 16/951* (2019.01); *G06F 16/9537* (2019.01); *G06K 9/00664* (2013.01); *G06K 2209/25* (2013.01); *G06K 2209/27* (2013.01)

(58) Field of Classification Search
  CPC ... G06F 16/951; G06F 16/29; G06K 9/00664; G06K 2209/25; G06K 2209/27
  USPC ................................. 707/736, 741, 769, 770
  See application file for complete search history.

(56) References Cited

U.S. PATENT DOCUMENTS

| | | | |
|---|---|---|---|
| 8,601,578 | B1 * | 12/2013 | Gertzenstein ...... G06Q 30/0259 726/22 |
| 8,676,001 | B2 | 3/2014 | Brucher et al. |
| 8,971,620 | B2 | 3/2015 | Zhang et al. |
| 9,129,179 | B1 | 9/2015 | Wong |
| 9,191,615 | B1 | 11/2015 | Valimaki et al. |
| 9,489,402 | B2 | 11/2016 | Quack |
| 2004/0201702 | A1 | 10/2004 | White |
| 2008/0143739 | A1 | 6/2008 | Harris et al. |
| 2009/0172030 | A1 | 7/2009 | Schiff et al. |
| 2010/0177956 | A1 | 7/2010 | Cooper et al. |
| 2010/0302429 | A1 | 12/2010 | Sakakima et al. |
| 2011/0044512 | A1 | 2/2011 | Bambha et al. |
| 2011/0072047 | A1 | 3/2011 | Wang et al. |
| 2011/0196888 | A1 | 8/2011 | Hanson et al. |
| 2012/0310968 | A1 | 12/2012 | Tseng |
| 2013/0086063 | A1 | 4/2013 | Chen et al. |
| 2013/0129142 | A1 | 5/2013 | Miranda-Steiner |
| 2014/0180571 | A1 | 6/2014 | Kimchi et al. |
| 2014/0207781 | A1 | 7/2014 | Quack |
| 2014/0223283 | A1 | 8/2014 | Hancock et al. |
| 2014/0297575 | A1 | 10/2014 | Rapoport et al. |
| 2015/0092061 | A1 | 4/2015 | Chao et al. |
| 2015/0161619 | A1 | 6/2015 | Yuksel |
| 2017/0011067 | A1 | 1/2017 | Masuko et al. |

FOREIGN PATENT DOCUMENTS

| | | |
|---|---|---|
| GN | 1875613 A | 12/2006 |
| GN | 103067856 A | 4/2013 |
| JP | H11-351888 A | 12/1999 |
| JP | 2004151523 A | 5/2004 |
| JP | 2008026253 A | 2/2008 |
| JP | 2013195863 A | 9/2013 |
| JP | 2013210974 A | 10/2013 |
| JP | 2015108604 A | 6/2015 |
| WO | 2011159460 A2 | 12/2011 |
| WO | 2014002223 A1 | 1/2014 |

OTHER PUBLICATIONS

Notice of Allowance for Korean Patent Application No. 10-2017-7030500 dated Apr. 27, 2020. 2 pages.
European Office Action for Application No. EP16751767.1 dated Dec. 9, 2019, pp. 1-8.
Li, Jia; Wang, James Z., "Real-Time Computerized Annotation of Pictures", Oct. 23-27, 2006.
International Search Report and Written Opinion for PCT Application No. PCT/US2016/045575, dated Sep. 20, 2016.
Amir Roshan Zamir et al.: "Visual business recognition," Proceedings of the 21st ACM International Conference on Multimedia, MM '13. Oct. 21, 2013 (Oct. 21, 2013),-Oct. 25, 2013 (Oct. 25, 2013). pp. 665-668, XP855315487, New York, New York, USA. DOI: 10.1145/2502081.2502174, ISBN: 978-1-4503-2404-5.
Tsai Tsung-Hung et al.: "Learning and Recognition of On-Premise Signs From Weakly Labeled Street View Images", IEEE Transactions on Image Processing, IEEE Service Center, Piscataway, NJ, US, vol. 23, No. 3, Mar. 2014 (Mar. 2014), pp. 1047-1059, XP011538255, ISSN: 1057-7149, DOI: 10.1109/TIP.2014.2298982.
International Search Report and Written Opinion for PCT Application No. PCT/US2016/45348, dated Nov. 15, 2016.
International Preliminary Report on Patentability for International Application No. PCT/US2016/045348 dated Feb. 15, 2018. 10 pages.
International Preliminary Report on Patentability dated Feb. 15, 2018, for International Application No. PCT/US2016/045575. 8 pages.
Takuya Takeuchi et al. Two or More Objects Recognition Using a Degree of Image Similarity and Word Concept Association. The 20th Annual Conference of the Japanese Society for Artificial Intelligence, 2006 [CD-ROM], Japan, the Japanese Society for Artificial Intelligence. Jun. 6, 2006. 1G2-03. 6 pages.
Notice of Reasons for Rejection for Japanese Patent Application No. 2017-556638, dated Sep. 21, 2018.
Notice of Office Action for Korean Patent Application No. 10-2017-7030500 dated May 30, 2019.
Examination Report for European Patent Application No. 16751767.1 dated Jun. 27, 2019. 7 pages.
Notice of Reasons for Rejector for Japanese Patent Application No. 2019-038399 dated Mar. 2, 2020.
Notification of the First Office Action for Chinese Patent Application No. 201680028434.X dated Jul. 3, 2020. 8 pages.
Maintenance of Oral Proceedings Letter for European Patent Application No. 16751767.1 dated May 8, 2020. 10 pages.
Notification of the Second Office Action for Chinese Patent Application No. 201680028434.X dated Apr. 1, 2021. 7 pages.

* cited by examiner

ESTABLISHMENT ANCHORING WITH GEOLOCATED IMAGERY

This application is a continuation of U.S. application Ser. No. 14/816,574, filed on Aug. 3, 2015, the disclosure of which is incorporated herein by reference.

BACKGROUND

Establishments, such as restaurants, gas stations, grocery stores, and other such businesses are constantly opening, closing, and moving to different locations. Directories which track establishment locations are therefore in constant need of updating to maintain accurate establishment locations. In some examples, a person may need to manually update the directory when an incorrect establishment is linked to a location. The need for manual input may result in delays or even a failure to update a directory resulting in inaccurate establishment locations.

SUMMARY

Embodiments within the disclosure relate generally to anchoring establishments at certain locations. One aspect includes a method for determining and updating an establishment's presence at a geographic location. A first image including location data associated with the first image's capture, wherein the location data includes a first image location, may be received by one or more processing devices. The one or more processing devices may then identify a set of images, wherein each image of the set of images include geographic location information and one or more identification marks, wherein the each identification mark is associated with one or more establishments; compare the first image to the set of images; determine, based on the comparing, that the first image contains one of the one or more identification marks of any of the images of the set of images; determine that one of the one or more establishments associated with the one of the one or more identification marks contained in the first image is currently located within a set proximity of the first image location; and update a location database by associating the one of the one or more establishments with a set location within the set proximity of the first image location.

Another embodiment provides a system for determining and updating an establishment's presence at a geographic location. The system may include one or more computing devices having one or more processors; and memory storing instructions, the instructions executable by the one or more processors. The instructions may include receiving a first image including location data associated with the first image's capture, wherein the location data includes a first image location; identifying, with one or more computing devices, a set of images, wherein each image of the set of images include geographic location information and one or more identification marks, wherein the each identification mark is associated with one or more establishments; comparing the first image to the set of images; determining, based on the comparison the first image contains one of the one or more identification marks; determining that one of the one or more establishments, associated with the one of the one or more identification marks contained in the first image, is currently located within a set proximity of the location the first image was captured; and updating a location database by associating the one of the one or more establishments with a set location within the set proximity of the first image location.

Another embodiment provides a non-transitory computer-readable medium storing instructions. The instructions, when executed by one or more processors, cause the one or more processors to: receive, with one or more computing devices, a first image including location data associated with the first image's capture, wherein the location data includes a first image location; identify, with one or more computing devices, a set of images, wherein each image of the set of images include geographic location information and one or more identification marks, wherein the each identification mark is associated with one or more establishments; compare, by the one or more computing devices, the first image to the set of images; determine, based on the comparing by the one or more computing devices, the first image contains one of the one or more identification marks; determine, by the one or more computing devices, one of the one or more establishments, associated with the one of the one or more identification marks contained in the first image, is currently located within a set proximity of the location the first image was captured; and update, by the one or more computing devices, a location database by associating the one of the one or more establishments with a final location within the set proximity of the first image location.

DETAILED DESCRIPTION

Overview

Figure 1:
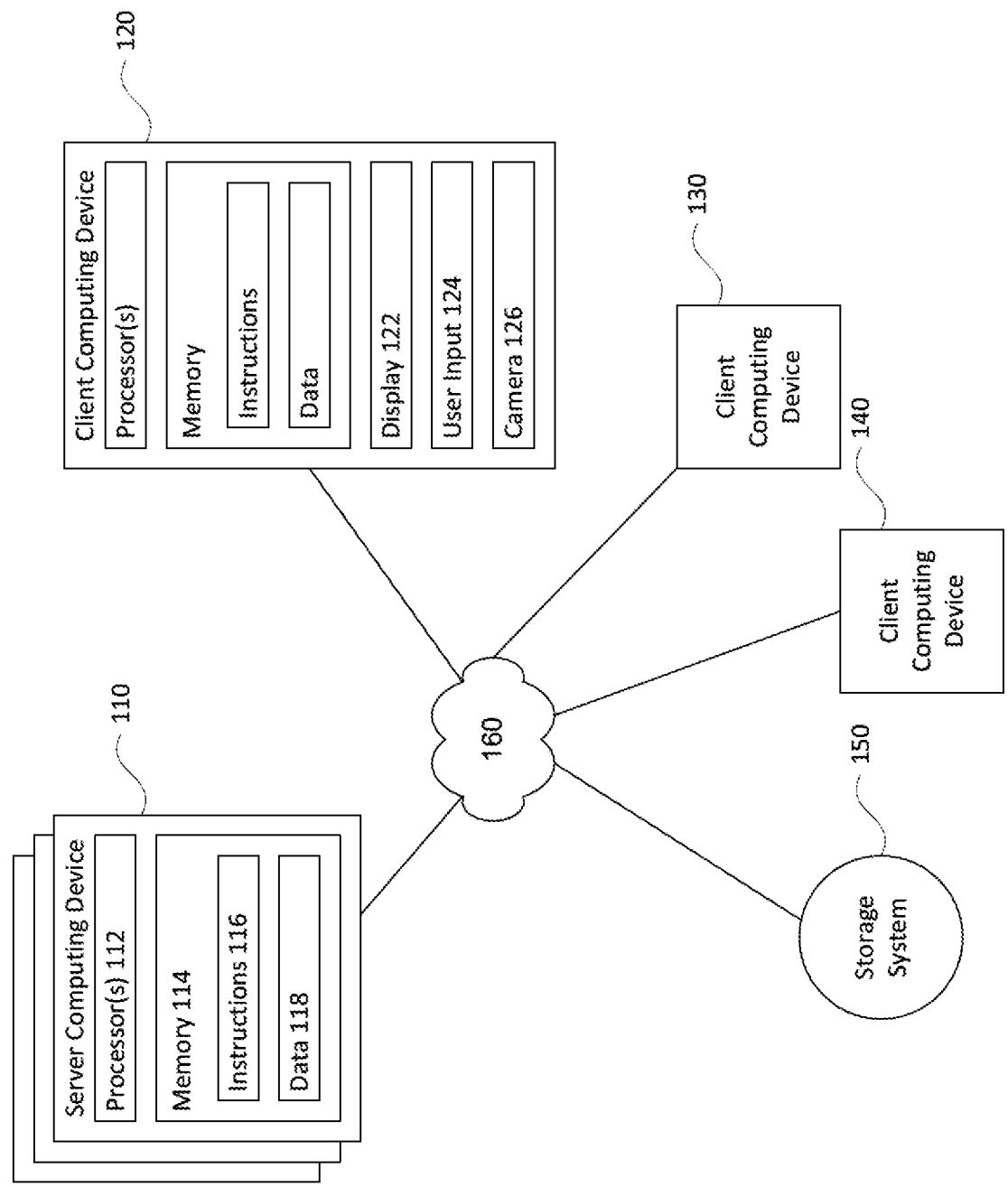
FIG. 1 is a functional diagram of an example system in accordance with aspects of the disclosure.

The technology relates to determining an establishment's presence at a specific geographic location. For example, images, such web-based images or images received from various sources, may contain location information, such as geolocation information. These images may be analyzed by one or more processing devices to determine whether the images include any identification marks indicative of an establishment. For every image which includes such an identification mark, a logo label indicating the image contains an identification mark may be associated with the image. In another example, logo labeled images may be retrieved from a storage system which stores images of identification marks such as logos. Further, an establishment associated with the identification mark may also be associated with the image.

A captured image, taken at a known location, may then be compared to a set of the logo labeled images which are associated with a location within a predetermined distance of the location of a captured image. In this regard, the captured images may be searched for any of the identification marks in the set of logo labeled images. Upon finding a matching identification mark, the presence of an establishment associated with the matched identification mark may be anchored at the location of the captured image.

In order to associate, or disassociate, an establishment at or from a certain location, publically available images, for example, web-based images from the Internet, may be gathered. In this regard, images from websites may be gathered and stored in a database, cache, etc. For example, a web crawler may continually crawl through Internet websites, and store every image that is found. Further, the web crawler may store the images in association with the web address from which the image was found. In another example, images may be retrieved from one or more storage systems such as those which store various types of images or those that specifically store images of identification marks such as logos.

Each image may be assigned a label which identifies, suggests or otherwise indicates the contents of the image. For example, automatic photo label technology may attach labels to each photo with confidence levels. In some embodiments, images which include identification marks of an establishment, such as a logo, business name, sign, etc., may be labeled as "logo."

Each image which is labeled as a logo may also be associated with a location, such as an address or geolocation. In this regard, each logo labeled image may contain either implicit or explicit location information.

Additionally, for any web-based images, each web-based image may be associated with an address found on the website from which the web-based image was or is found. One or more websites that are associated with a logo labeled web-based image may be considered authority webpages for the identification mark within the web-based image.

A captured image may then be compared to logo labeled images. In this regard, the one or more processing devices may perform an image-within-image search to determine whether any portion of the captured image matches any identification marks found in the logo labeled images. Image-within-image searching may be performed using an image matching algorithm. While performing the image-within-image search, variants of the captured image and/or logo labeled images may also be compared.

The captured image may also be compared to a set of logo labeled images. In this regard, the captured image may be compared only to a set of logo labeled images which are within a predetermined distance of the captured image.

Upon finding a matching identification mark between the captured image and one of the logo images, the establishment associated with the matched identification mark may be anchored at, or associated with a location within a set proximity of the location of the captured image. As such, location data, such as mapping data, business directories, etc. may be updated to provide current location information for the establishment associated with the matched identification mark. Further, if the identification mark is associated with an authoritative website, and the location of the captured image is at or near the location found on the authoritative website, the anchoring of the establishment may be done with high confidence.

In one example, if an establishment moves or closes, new captured images may not include an identification mark present in past captured images. Accordingly, as new captured images are compared to logo labeled images, an identification mark that was not present before, may start to appear, and the previous identification mark may no longer be present. This might indicate the establishment associated with the previous identification mark should be marked as closed or moved. As such, mapping data, business directories, and other location dependent data may be continuously updated to provide establishments currently situated at a location.

In addition, such an indication of a closure may be further verified by searching the authority webpages of the previous identification mark and the new identification mark. If the authority page of the new identification mark indicates the location of the first location, and the authority page of the old identification mark indicates a different location than the first location, high confidence can be inferred that a new establishment is present at the first location.

EXAMPLE SYSTEMS

Figure 2:
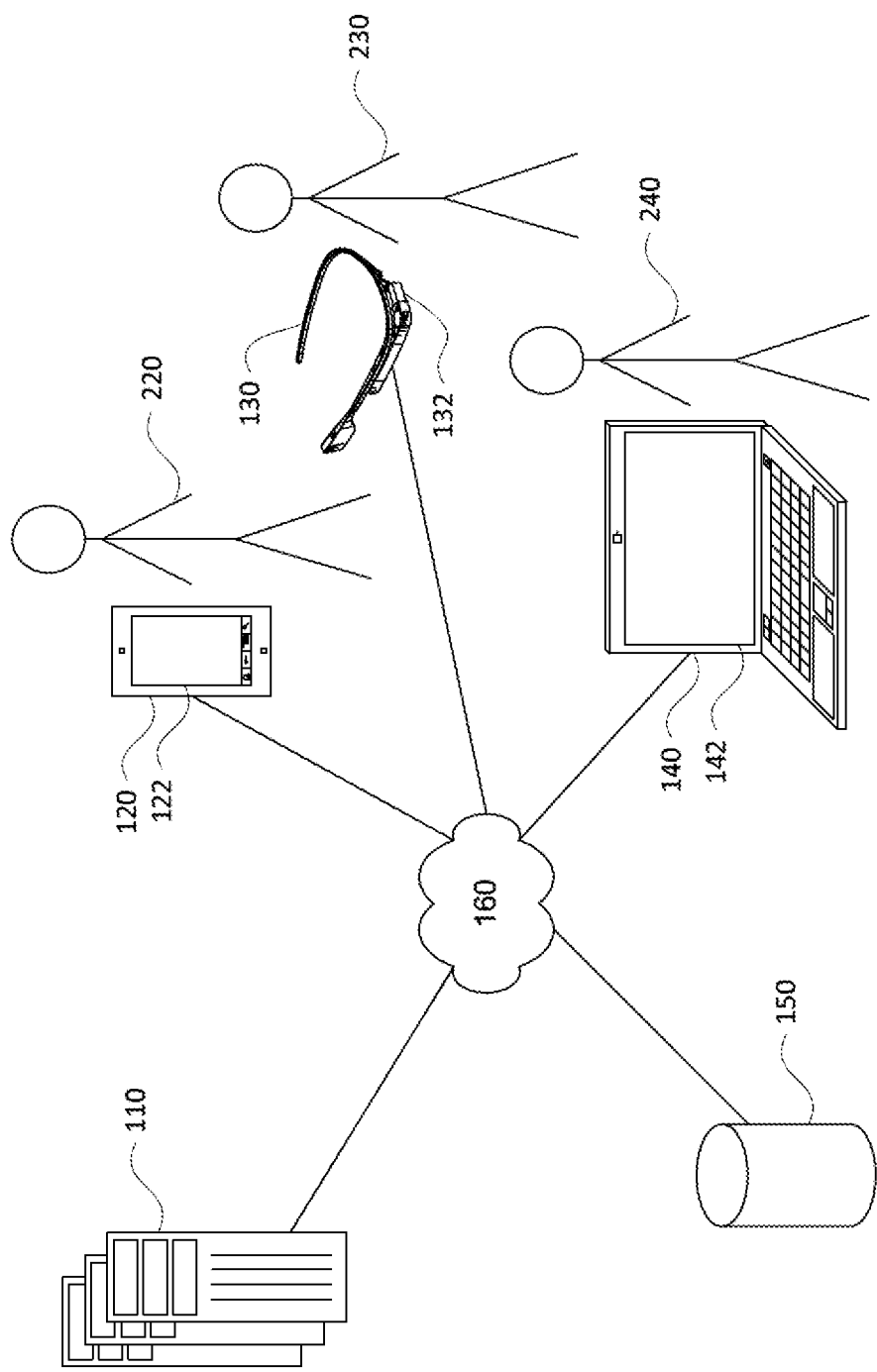
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Each computing device 110 can contain one or more processors 112, memory 114 and other components typically present in general purpose computing devices. Memory 114 of each of computing devices 110, 120, 130, and 140 can store information accessible by the one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 118 may be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices 110 can be at different nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described herein.

Each of the client computing devices 120, 130, and 140 may be configured similarly to the server computing devices 110, with one or more processors, memory and instructions as described above. Each client computing device 120, 130, or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen, or microphone). The client computing device may also include a camera for recording video streams and/or capturing images, speakers, a network interface device, and all of the components used for connecting these elements to one another.

Although the client computing devices 120, 130, and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and 140 (not shown).

Storage system 150 may store various images. These images may include web-based images gathered from the Internet, may be gathered. In this regard, images from websites may be gathered and stored in storage system 150. For example, a web crawler may continually crawl through Internet websites, and store every image that is found. Further, the web crawler may store the images in association with the web address from which the image was found. In another example, images may be retrieved from one or more other storage systems such as those which store various types of images and associated EXIF data and/or those that specifically store images of identification marks such as logos. In this example, each logo image may be associated with address or location information for the logo corresponding to the business or location where the logo can be found.

EXAMPLE METHODS

Figure 3:
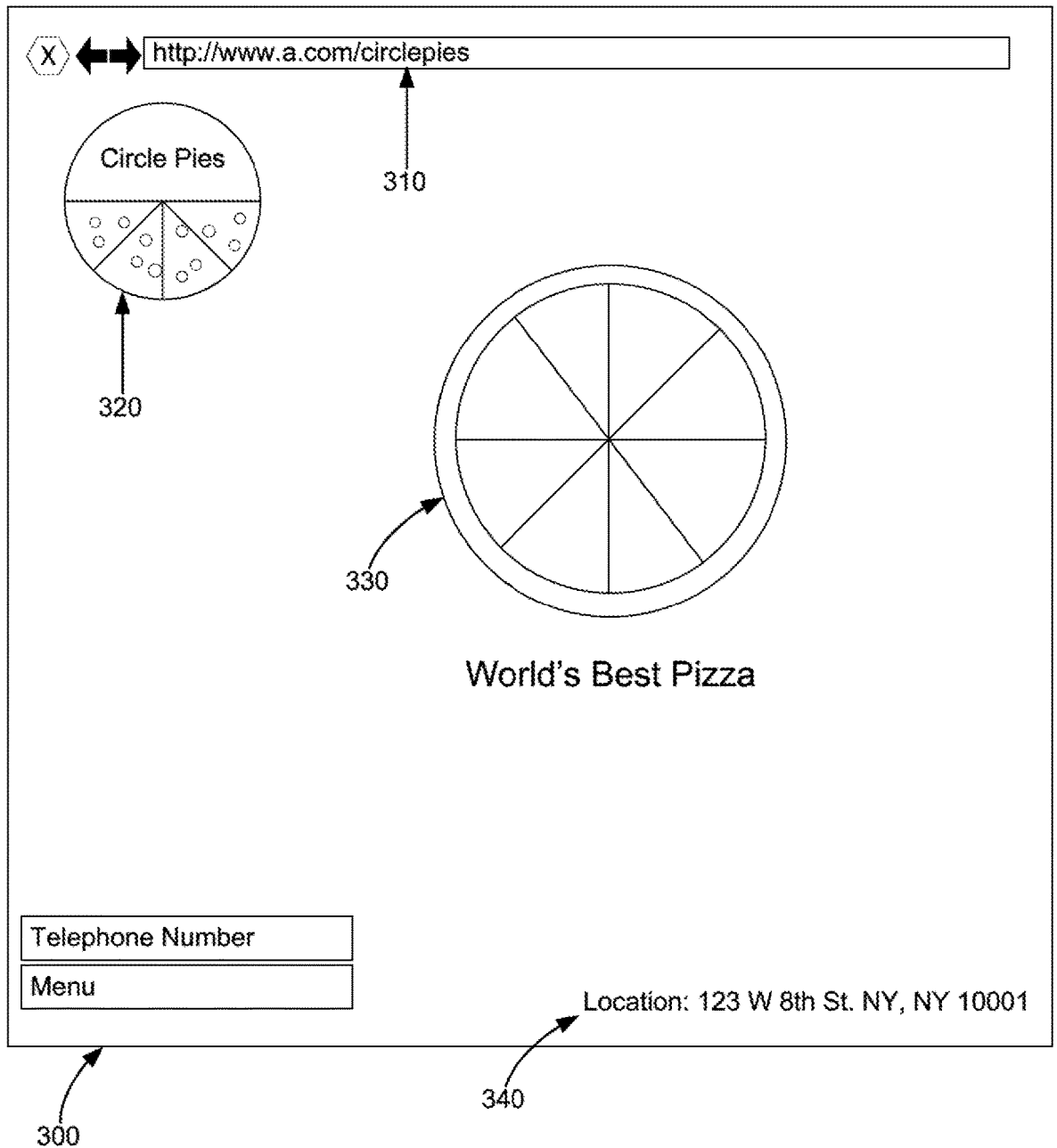
FIG. 3 is an example website associated with a image in accordance with aspects of the disclosure.

In order to associate, or in some cases disassociate, an establishment at or from a certain location, a plurality of images may be collected. In one example, web-based images may be gathered from the Internet and stored as a collection of web-based images. In this regard, a web crawler may continually crawl through internet websites, and store every image that is found. The images from the websites may be gathered and stored in a database, cache, etc. of storage system 150. FIG. 3 shows an example of a website 300 of a company "Circle Pies." A web crawler may crawl to website 300, by going to the web-address 310 of Circle Pies. The web crawler may then review the data on the website 300, and determine that the website 300 contains two web-based images 320 and 330. Based on this determination, the web crawler may store web-based images 320 and 330, for example, at storage system 150. In some embodiments, the web crawler may be blocked from visiting certain websites. In this regard the web crawler may be programmed to avoid crawling to one or more websites.

The web crawler may also store the web-based images in association with the web address of the website which the image was found. For example, website 300 may be located at web address 310 "http://www.a.com/circlepies." The web-based images 320 and 330 may then be stored in association with the web address 310 in a collection of web-based images stored at the storage system 150.

In another example, images may be retrieved from one or more other storage systems such as those which store various types of images and associated EXIF data and/or those that specifically store images of identification marks such as logos. In this example, each logo image may be associated with address or location information for the logo corresponding to the business or location where the logo can be found. Each of the collected and/or retrieved images may be assigned a label which indicates the contents of the image. For example, automatic photo label technology may attach labels to each web-based photo with confidence levels. Labels may include "person" for a picture of an individual, and "car" for images which identify cars. Confidence levels may include a rating, such as a value from 0-1, 1-100, or 1-10 or other such rating systems, which indicates the likelihood that a label which is applied to one of the images is a correct description of the contents of the image.

Images may be analyzed by one or more processors, such as processors 112 of one or more server computing devices 110, to determine whether the images include any identification marks indicative of an establishment. Establishments may include businesses, organizations, associations, condominiums etc. In this regard, the photo label technology may be used to determine images which include identification marks, and assign a logo label indicating the image contains an identification mark. Images which include identification marks of an establishment, such as a logo, business name, clip art, sign, etc., may be labeled as "logo," by the automatic photo label technology. In some embodiments, images which include identification marks of an establishment may be assigned a label other than "logo," to indicate that the images include identification marks. For example, images which include identification marks of an establishment may be clustered into a group of images with labels such as "business name," "sign," "clip art," etc. As another example, images may already be associated with information identifying the image as one that includes a logo, such as identifies in EXIF data. This information may also be used to label the image as including a logo, for example, associating the image with the logo label.

Additionally, an establishment associated with an identification mark may also be associated with the image. For example, the automatic photo label technology, implemented by one or more processors, such as processors 112 of one or more server computing devices 110, may find that image 330 is an image of a pizza, and the automatic photo label technology therefore assigns image 330 a label of "food." In one example, techniques which analyze contents within a photo, to assign an annotation describing the contents to the photo, such as those that utilize statistical classification methods to automatically linguistically index pictures, may be used to automatically label photos. In some embodiments, a machine learning model may be trained on manually labeled images relative to a reference taxonomy. The trained machine learning model may then automatically assign labels to images in accordance with the reference taxonomy. For image 320, the automatic photo label technology may determine that image 320 is the logo for the establishment Circle Pies, and therefore a logo label may be assigned to image 320. Further, image 320 may also be associated with the establishment of Circle Pies.

Each image which is labeled as a logo may also be associated with a location, such as an address or geolocation. In this regard, each logo labeled image may contain explicit location information stored directly in the metadata stored in association with each logo labeled image. For example, a logo labeled image may include an explicit longitude and latitude reading in the image's metadata, such as the EXIF information. EXIF data may provide the location the image was captured.

Alternatively, or in addition to the explicit location information, implicit location information may be derived from determining the location of objects captured in each of the image. For example, a image may have captured the Statue of Liberty. The location of the Statute of Liberty may be known, and an estimation of the location of where the image was captured can be made based on the known location. In this regard, the estimation of the location can be refined based on the image data, such as the direction from which the image was captured. In another embodiment implicit image location data for a web-based image may be inferred from the website which the web-based image was found. For example, a website which hosts a web-based image may include an address. The address on the website may then be associated with the web-based image hosted on the website.

Additionally, each web-based image may be associated with an address found on the website from which the web-based image was or is found. For example, in FIG. 3, website 300 includes a street address 340. Logo labeled web-based image 320 may then be associated with street address 340 as its location.

One or more websites that are associated with a logo labeled web-based image may be considered authority webpages for the identification mark within the web-based image. In other words, an authority page may be an official or unofficial webpage of the establishment associated with the identification mark found within the respective web-based image. For example, website 300 may be the official website for the establishment "Circle Pies". In this regard, website 300 at web address 310 may be made an authority page for the web-based image 320 which includes the identification mark belonging to the establishment Circle Pies. Accordingly, web-based image 320 may be associated with an indication that it was found on an authority page. In some embodiments, websites which contain copyrighted or proprietary material may not be used as authority pages.

Figure 4:
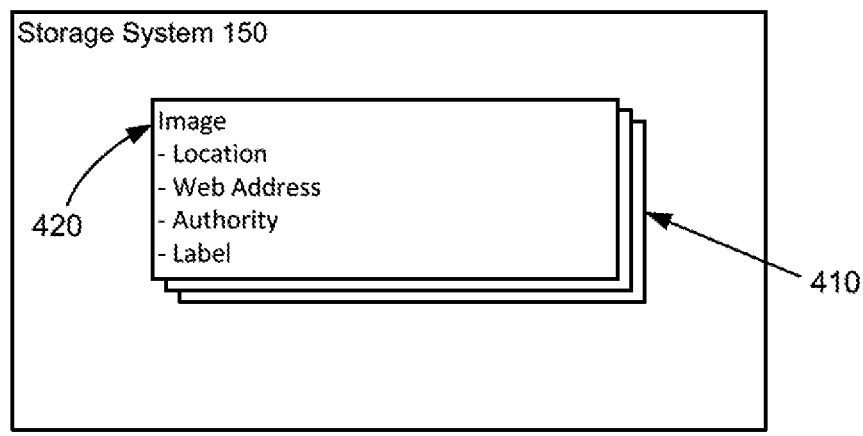
FIG. 4 is an example of a database in accordance with aspects of the disclosure.

Information corresponding to the images may be stored in an association with the collection of images in storage system 150. For example, each web-based image may be stored in association with the web address where the web-based image was found, the location where the image was captured, an authority page indicator, the label(s) assigned to the web-based image, etc. FIG. 4 shows an example block diagram of storage system 150 storing the web-based image 420 as well as a part of a collection of web-based images 410. Here, image 420, as well as some or all of the other images of the collection of web-based images 410, is stored in association with is corresponding information including a location, web address, an authority page indicator, and a label.

Figure 5:
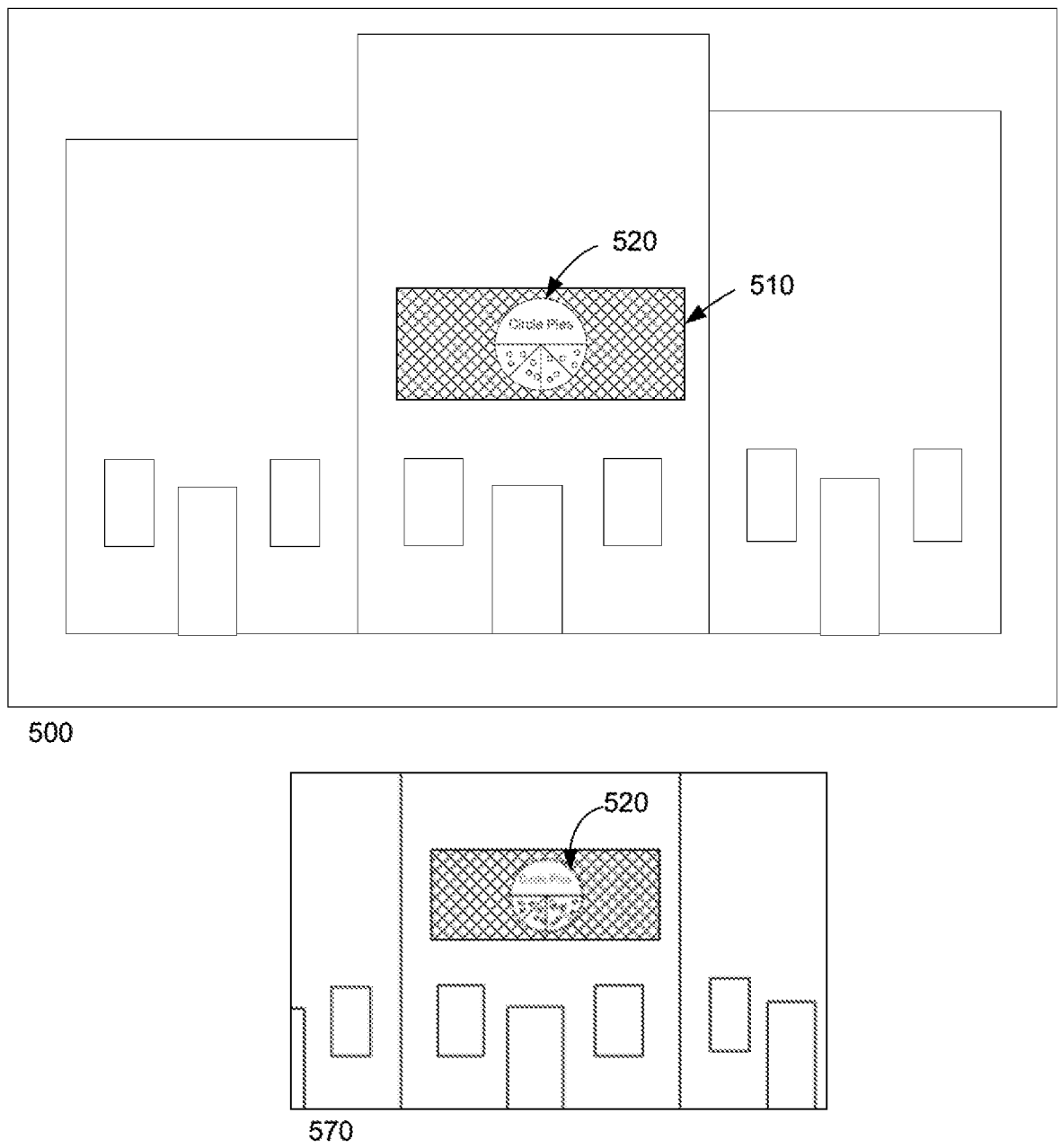
FIG. 5 is an example of image and tracking features in accordance with aspects of the disclosure.
Figure 5:
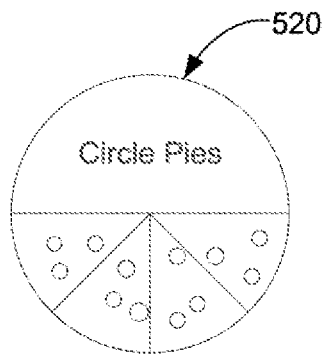

A captured image, which is not part of the collection of images, may be identified, for example, received as input at the one or more processors, such as processors 112 of one or more server computing devices 110. The captured image may include a timestamp indicating the time and/or date when the captured image was taken, and location information indicating where the captured image was taken. As shown in FIG. 5 an image 570 may be captured of a scene 500 which includes an establishment, here a pizzeria restaurant. The image 570 may include the front entrance of the pizzeria, as well as a sign 510. The sign may include the pizzeria's logo 520. Captured images may include, for example, street level photos, tourist photos, personal photos, etc.

The captured image may then be compared to logo labeled images. The one or more processors, such as processors 112 of one or more server computing devices 110, may perform an image-within-image search to determine whether any portion of the captured image matches any identification marks found in any of the logo labeled images of the collection of images 410. Image-within-image searching may be performed using an image matching algorithm, such as a quantum adiabatic algorithm. Turning again to FIG. 5, the portion of the image 570 which includes the pizzeria's logo 520 may be compared to image data found within the logo labeled images.

Figure 6:
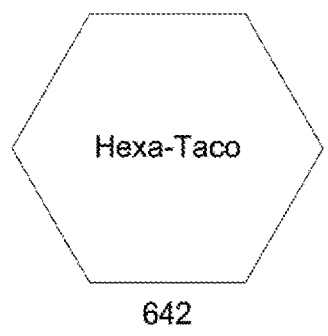
FIG. 6 is an example of an image-within-image search in accordance with aspects of the disclosure.
Figure 6:
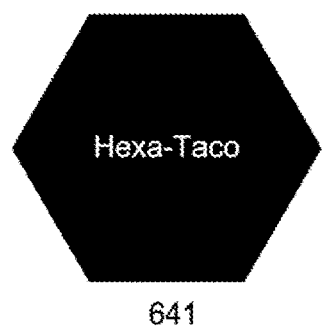
Figure 6:
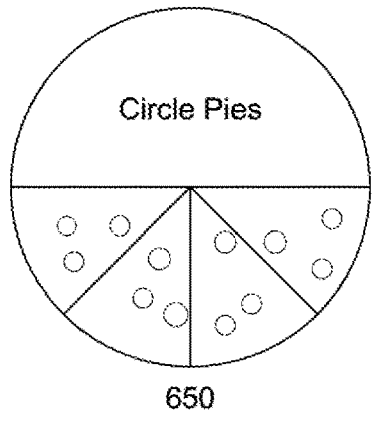
Figure 6:
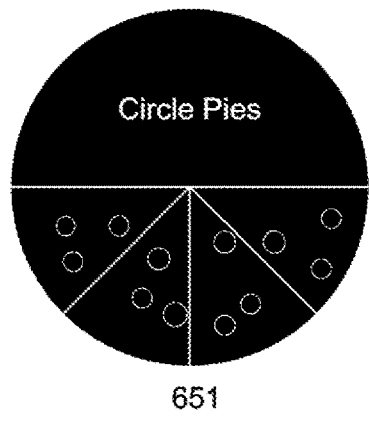
Figure 6:
Figure 6:
Figure 6:
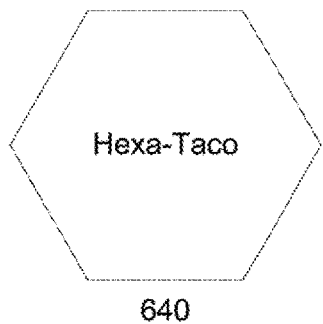
Figure 6:
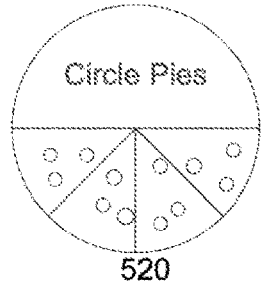
Figure 6:
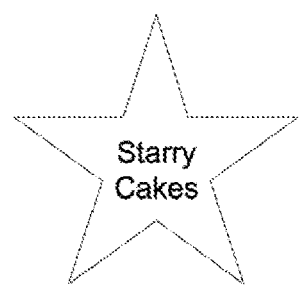

While performing the image-within-image search, variants of the captured image and/or logo labeled images may also be compared to one another. In this regard, high-contrast versions, inverse color versions, black and white versions, and/or black and white inverted versions of the images may be used. FIG. 6 shows example variations of the images which may be used. For example, high contrast versions 642 and 662 of logo labeled images 640 and 660 may be compared to a high contrast version 650 of captured image 520. In another example, black and white versions 641 and 661 of logo labeled images 640 and 660 may be compared to a black and white version 651 of captured image 520.

In some instances, rather than being compared to all of the images in the collection of images 410, the captured image may be compared to a specific set of logo labeled images. This set of logo labeled images may be identified based on the corresponding information for the images in the collection of images 410. By comparing the captured image to a set of logo labeled images rather than all such images, processing power and time may be saved, as a smaller number of images may be compared to the captured image.

In one example, the captured image may be compared only to a set of logo labeled images which are associated with a location or geolocation within a predetermined distance of the captured image. For example, a captured image, taken at a known location, may be compared to a set of the logo labeled images which are associated with a location within a predetermined distance of the location of a captured image.

Figure 7:
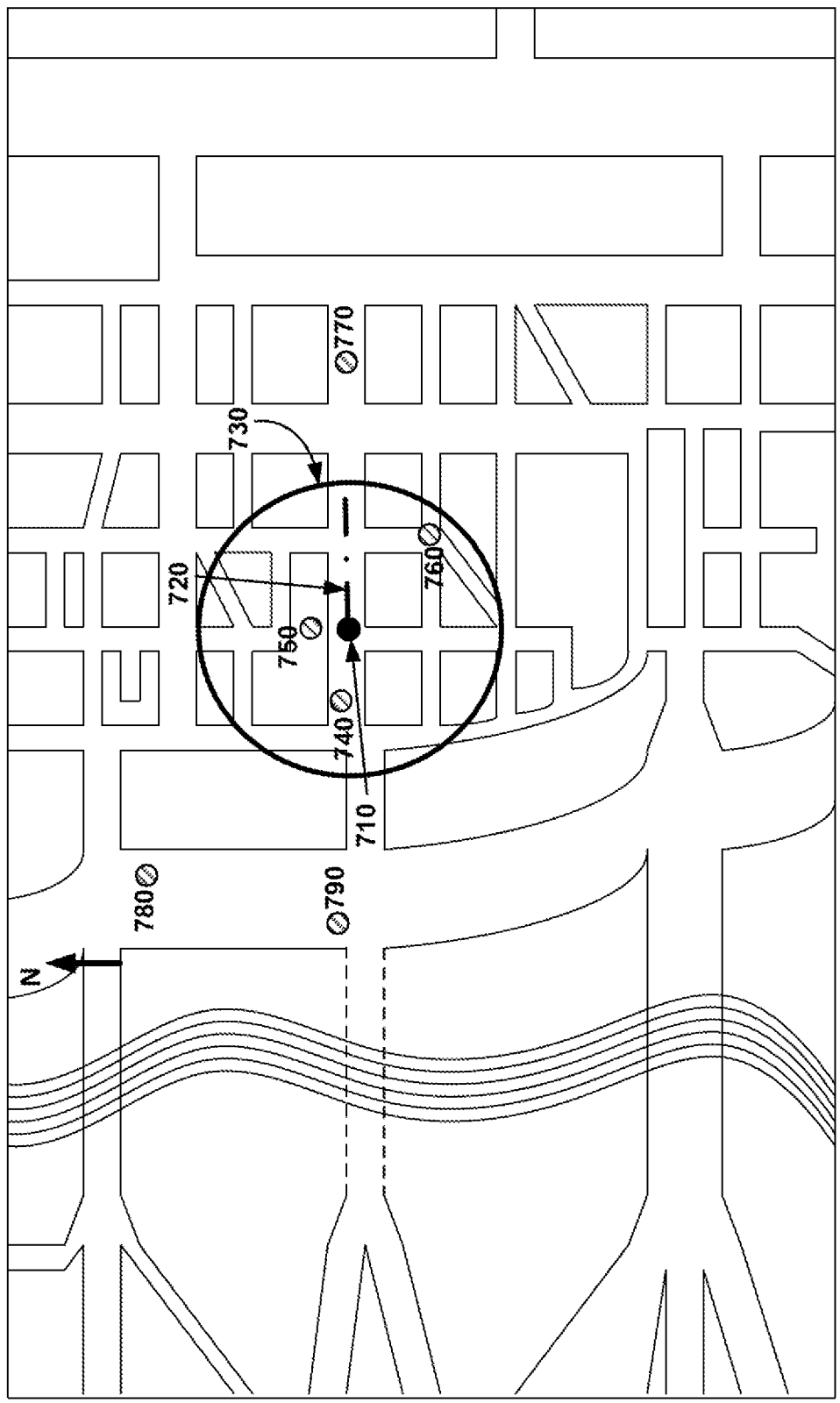
FIG. 7 is an example of determining and comparing images which are within a predetermined distance of a captured image.

As shown in FIG. 7 a captured image may have been captured at location 710. Logo labeled images may have been captured at or are otherwise stored at storage system 150 in association with locations 740-790. A set of the logo labeled images may be determined to be within a predetermined distance 720 of location 710. Accordingly, the logo labeled images found within radius 730 of location 710 may be added to or included in the set of logo labeled images. Thus, logo labeled images captured at geolocations 740-760 may be added to or included in the set of the logo labeled images that are compared to the captured image.

In addition or alternatively, the set of logo labeled images may also be identified based on the confidence level of the images. In this regard, a given logo labeled images may be added or included in a set of logo labeled images if the assigned confidence level of the given logo labeled image meets or is above a minimum threshold value.

Upon finding a matching identification mark between the captured image and one of the logo labeled images, the one or more processors, such as processors 112 of one or more server computing devices 110, may anchor or associate the establishment associated with the matched identification mark to or with the location of the captured image. In some examples the establishment may be anchored at, or associated with a set location within a set or predetermined proximity of the location of the captured image. In other embodiments the set location may be a street address. As such, location data, stored in a location database, such as mapping data, business directories, etc. may be updated to provide current location information for the establishment associated with the matched identification mark.

In order to ensure that the anchoring is done with high confidence, certain criteria may be required to be met before anchoring the identification mark at the location of the captured image. For example, if the identification mark is associated with an authoritative website, and the location of the captured image is at or near the location found on the authoritative website, the anchoring of the establishment may be done with high confidence. In another example, a set number of new captured images, such as 5 or more or less, may need to have the same matching identification mark before an establishment is anchored to the location of the captured image in order to ensure a high confidence.

In one example, if an establishment moves or closes, new captured images may not include an identification mark present in past captured images. Accordingly, as new captured images are compared to a set of logo labeled images, an identification mark that was not present before, may start to appear, and the previous identification mark may no longer be present. This might indicate an establishment associated with the previous identification mark should be marked as closed or moved.

In addition, such an indication of a closure may be further verified by searching the authority webpages of the previous identification mark and the new identification mark. If the authority page of the new identification mark indicates the location of the first location, and the authority page of the old identification mark indicates a different location than the first location, high confidence can be inferred that a new establishment is present at the first location.

Figure 8:
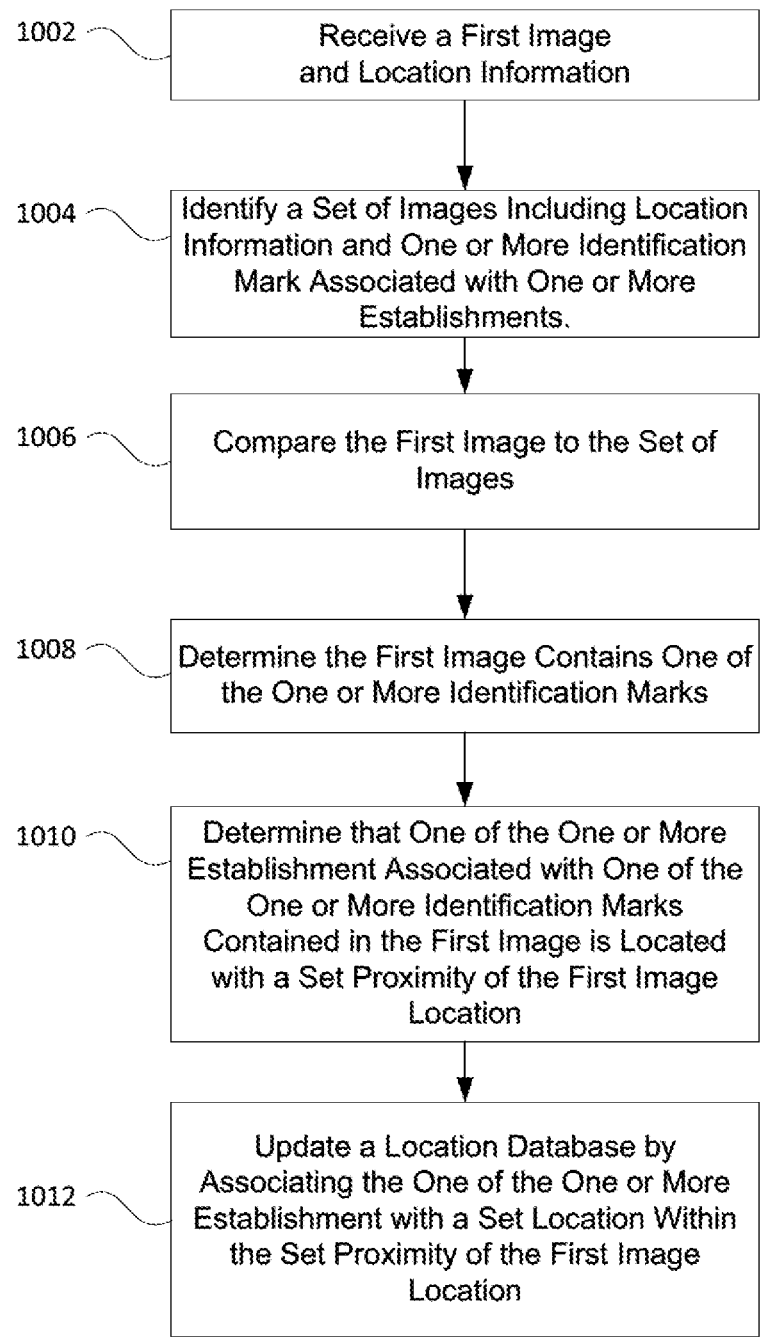
FIG. 8 is a flow diagram in accordance with aspects of the disclosure.

Flow diagram 800 of FIG. 8 is an example flow diagram of some of the aspects described above that may be performed by one or more computing devices such as client computing devices 110-140. In this example, at block 1002 a first image and associated location information may be received. At block 1004 a set of images, including geolocation information, and one or more identification marks associated with one or more establishments, may be received. Then, as shown at block 1006, the first image may be compared to the set of images. During the comparison, as shown at block 1008, it can be determined if the first image contains one of the one or more identification marks associated with one or more establishment found in the set of images. If a first image contains one of the one or more identification marks, the establishment associated with the one or more identification marks may be determined to be within asset proximity of the first image location as shown in block 1010. A location database may be updated to associate the establishment with a set location within the set proximity of the first image location, as shown in block 1012.

In the foregoing examples, the plurality of images may be images other than, or in addition to, the images. For example, the plurality of images may include one or more images stored in a storage device, such as storage system 150, in association with corresponding location information indicating where the respective one or more images was captured, a set of images with corresponding EXIF data, etc., and various combinations of the foregoing.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer implemented method for determining and updating an establishment's presence at a geographic location, the method comprising:
   receiving, with one or more processing devices, a first image including location data, wherein the location data includes a first image location;
   generating, with the one or more processing devices, one or more variants of the first image;
   receiving a collection of images;
   assigning a label to each image in the collection of images which contain at least one identification mark;
   receiving, with the one or more processing devices, a set of one or more images from the collection of images, wherein each image of the set of images includes one or more identification marks and at least one label, wherein each identification mark is associated with one or more establishments;
   performing an image-in-image search for a matching identification mark between the first image and at least one of the one or more variants, and at least one image in the set of images;
   determining, by the one or more processing devices, based on the image-in-image search that the first image or at least one of the one or more variants contains at least one matching identification mark with an image in the set of images;
   determining, by the one or more processing devices, that the first image location is within a set proximity of a listed location retrieved from an authoritative webpage, wherein the authoritative webpage is the webpage of the one or more establishments associated with the at least one matching identification mark; and
   updating, by the one or more processing devices, a location database by associating the one or more establishments associated with the matching identification mark with the first image location upon determining that the first image location is within the set proximity of the listed location on the authoritative webpage.

2. The method of claim 1, wherein the one or more variants of the first image include:
   a high-contrast version of the first images;
   a color inverted version of the first images;
   a black and white version of the first images; and/or
   a black and white inverted version of the first images.

3. The method of claim 1, wherein the listed location retrieved from the authoritative webpage includes an address.

4. The method of claim 1, wherein the first image geographic location information includes a longitude and latitude reading corresponding to a location the first image was captured.

5. The method of claim 1, wherein determining that the first image location is within the set proximity of the listed location includes determining the first image location is within a set radius of the listed location.

6. A system for determining and updating an establishment's presence at a geographic location, the system comprising:
   one or more computing devices having one or more processors; and
   memory storing instructions, the instructions executable by the one or more processors;
   wherein the instructions comprise:
      receiving a first image including location data, wherein the location data includes a first image location;
      generating one or more variants of the first image;
      receiving a collection of images;
      assigning a label to each image in the collection of images which contain at least one identification mark;
      receiving a set of one or more images from the collection of images, wherein each image of the set of images includes one or more identification marks and at least one label, wherein each identification mark is associated with one or more establishments;
      performing an image-in-image search for a matching identification mark between the first image and at least one of the one or more variants, and at least one image in the set of images;
      determining based on the image-in-image search that the first image or at least one of the one or more variants contains at least one matching identification mark with an image in the set of images;
      determining that the first image location is within a set proximity of a listed location retrieved from an authoritative webpage, wherein the authoritative webpage is the webpage of the one or more establishments associated with the at least one matching identification mark; and
      updating a location database by associating the one or more establishments associated with the matching identification mark with the first image location upon determining that the first image location is within the set proximity of the listed location on the authoritative webpage.

7. The system of claim 6, wherein the one or more variants of the first image include:
   a high-contrast version of the first images;
   a color inverted version of the first images;
   a black and white version of the first images; and/or
   a black and white inverted version of the first images.

8. The system of claim 6, wherein the listed location retrieved from the authoritative webpage includes an address.

9. The system of claim 6, wherein the first image geographic location information includes a longitude and latitude reading corresponding to a location the first image was captured.

10. The system of claim 6, wherein determining that the first image location is within the set proximity of the listed location includes determining the first image location is within a set radius of the listed location.

11. A non-transitory computer-readable medium storing instructions, which when executed by one or more processors, cause the one or more processors to:
- receive a first image including location data, wherein the location data includes a first image location;
- generate one or more variants of the first image;
- receive a collection of images;
- assign a label to each image in the collection of images which contain at least one identification mark;
- receive a set of one or more images from the collection of images, wherein each image of the set of images includes one or more identification marks and at least one label, wherein each identification mark is associated with one or more establishments;
- perform an image-in-image search for a matching identification mark between the first image and at least one of the one or more variants, and at least one image in the set of images;
- determine based on the image-in-image search that the first image or at least one of the one or more variants contains at least one matching identification mark with an image in the set of images;
- determine that the first image location is within a set proximity of a listed location retrieved from an authoritative webpage, wherein the authoritative webpage is the webpage of the one or more establishments associated with the at least one matching identification mark; and
- update a location database by associating the one or more establishments associated with the matching identification mark with the first image location upon determining that the first image location is within the set proximity of the listed location on the authoritative webpage.

12. The non-transitory computer-readable medium of claim 11, wherein the one or more variants of the first image include:
- a high-contrast version of the first images;
- a color inverted version of the first images;
- a black and white version of the first images; and/or
- a black and white inverted version of the first images.

13. The non-transitory computer-readable medium of claim 11, wherein the listed location retrieved from the authoritative webpage includes an address.

14. The non-transitory computer-readable medium of claim 11, wherein determining that the first image location is within the set proximity of the listed location includes determining the first image location is within a set radius of the listed location.

* * * * *